(12) United States Patent
Kleinhenz et al.

(10) Patent No.: US 8,833,501 B2
(45) Date of Patent: Sep. 16, 2014

(54) TRACTOR

(75) Inventors: Andreas Kleinhenz, Rosshaupten (DE);
Gerhard Mariner, Bidingen (DE);
Guido Nagele, Marktoberdorf (DE);
Klaus-Jurgen Satzger, Baisweil (DE);
Hans Heinle, Biessenhofen (DE);
Robert Heisler, Marktoberdorf (DE)

(73) Assignee: AGCO Corporation, Duluth, GA (US)

( * ) Notice: Subject to any disclaimer, the term of this patent is extended or adjusted under 35 U.S.C. 154(b) by 268 days.

(21) Appl. No.: 13/389,035

(22) PCT Filed: Jul. 22, 2010

(86) PCT No.: PCT/EP2010/060611
§ 371 (c)(1),
(2), (4) Date: May 17, 2012

(87) PCT Pub. No.: WO2011/015458
PCT Pub. Date: Feb. 10, 2011

(65) Prior Publication Data
US 2012/0217082 A1 Aug. 30, 2012

(30) Foreign Application Priority Data
Aug. 5, 2009 (GB) .................................. 0913581.5

(51) Int. Cl.
*B60K 13/04* (2006.01)
*B60K 11/08* (2006.01)
*F01N 3/20* (2006.01)

(52) U.S. Cl.
CPC ......... *F01N 3/2066* (2013.01); *B60Y 2200/221* (2013.01); *B60K 11/08* (2013.01); *F01N 2610/1406* (2013.01); *F01N 2610/02* (2013.01); *Y02T 10/24* (2013.01); *F01N 2610/1413* (2013.01); *F01N 2340/04* (2013.01)
USPC .......................................................... 180/309

(58) Field of Classification Search
CPC . B60K 13/04; F01N 2340/04; F01N 13/1822; F01N 13/082; F01N 3/20; B62D 49/00
USPC ........................................ 180/89.2, 296, 309
See application file for complete search history.

(56) References Cited

U.S. PATENT DOCUMENTS 6,063,350 A * 5/2000 Tarabulski et al. .......... 423/239.1
6,422,005 B2 * 7/2002 Dolling et al. .................. 60/286

(Continued)

FOREIGN PATENT DOCUMENTS

DE 876813 C 5/1953
EP 0646485 A2 4/1995

(Continued)

OTHER PUBLICATIONS

International Search Report for International Application No. PCT/EP2010/060611 Dated Oct. 28, 2010.

(Continued)

*Primary Examiner* — Hau Phan
*Assistant Examiner* — Jacob Meyer

(57) ABSTRACT

A tractor has a chassis (10) which supports an engine (4) towards the front thereof. A deflecting shield (8) is positioned to the rear of the engine to deflect sideways hot air which has passed over the engine, and a tank (15) for the storage of urea based fluid for injection into an exhaust system of the engine is located behind the engine to the rear of the deflecting shield. The chassis to the rear of the engine may have an open-topped section (11a) between the engine (4) and a transmission housing (12), the tank being at least partially housed within the open-topped section of the chassis to shield the tank from the hot air which has passed over the engine and from the heating effects of the sun.

4 Claims, 7 Drawing Sheets

(56) References Cited

U.S. PATENT DOCUMENTS

| | | | |
|---|---|---|---|
| 6,442,932 B1* | 9/2002 | Hofmann et al. | 60/274 |
| 6,941,746 B2* | 9/2005 | Tarabulski et al. | 60/286 |
| 7,293,408 B2* | 11/2007 | Kohler et al. | 60/286 |
| 8,056,671 B2* | 11/2011 | Ikegami et al. | 180/309 |
| 8,327,623 B2* | 12/2012 | Raman | 60/286 |
| 8,403,099 B2* | 3/2013 | Yokota | 180/309 |
| 8,459,014 B2* | 6/2013 | Kamiya et al. | 60/295 |
| 8,573,646 B2* | 11/2013 | Kamiya | 280/759 |
| 2006/0010858 A1* | 1/2006 | Kohler et al. | 60/286 |
| 2009/0094968 A1* | 4/2009 | Ikegami et al. | 60/310 |
| 2010/0038162 A1* | 2/2010 | Kamiya et al. | 180/69.6 |
| 2010/0132333 A1* | 6/2010 | Endo et al. | 60/285 |
| 2010/0162690 A1* | 7/2010 | Hosaka et al. | 60/295 |
| 2010/0293928 A1* | 11/2010 | Kamiya et al. | 60/295 |
| 2010/0327884 A1* | 12/2010 | McCall et al. | 324/682 |
| 2011/0005210 A1* | 1/2011 | Erdmann et al. | 60/295 |
| 2011/0005853 A1* | 1/2011 | Kamiya | 180/296 |
| 2011/0088587 A1* | 4/2011 | Willbrandt et al. | 105/62.1 |
| 2012/0067660 A1* | 3/2012 | Kashu et al. | 180/296 |
| 2012/0067661 A1* | 3/2012 | Kashu et al. | 180/309 |
| 2012/0174566 A1* | 7/2012 | Yamashita et al. | 60/295 |
| 2013/0071295 A1* | 3/2013 | Terakawa et al. | 422/168 |
| 2013/0294876 A1* | 11/2013 | Kobayashi et al. | 414/744.2 |

FOREIGN PATENT DOCUMENTS

| | | | | |
|---|---|---|---|---|
| JP | 59070263 A | | 4/1984 | |
| JP | 59070263 A | * | 4/1984 | B62D 49/00 |
| JP | 61067677 A | | 4/1986 | |
| JP | 04066328 A | | 3/1992 | |
| WO | WO-2007/126366 A1 | | 11/2007 | |
| WO | WO-2009/072494 A1 | | 6/2009 | |

OTHER PUBLICATIONS

United Kingdom Search Report for United Kingdom Application No. 0913581.5 Dated Nov. 18, 2009.

\* cited by examiner

TRACTOR

BACKGROUND OF THE INVENTION

1. Field of Invention

This invention relates to tractors and in particular to storage arrangements on such tractors for fluids such as urea based fluids which are injected under pressure into the exhaust gases of the engines of such tractors to reduce toxic emissions.

2. Description of Related Art

There is a requirement to provide a compact and convenient storage arrangement which also assists in protecting the urea based fluid from excessive heat as such fluids should be maintained, if possible, below 60° C. otherwise they start to break down into their corrosive constituents which can damage components of the urea injection system. Particular problems can arise when the fluid is stored in close proximity to the tractor's engine which is a source of considerable heat.

BRIEF SUMMARY OF THE INVENTION

Thus in accordance with the present invention there is provided a tractor having a chassis which supports an engine towards the front thereof, a deflecting shield positioned to the rear of the engine to deflect sideways hot air which has passed over the engine, and a tank for the storage of urea based fluid for injection into an exhaust system of the engine, the tank being located behind the engine to the rear of the deflecting shield and wherein the chassis to the rear of the engine has an open-topped section between the engine and a transmission housing and the tank is at least partially housed within the open-topped section of the chassis.

The chassis to the rear of the engine may have an open-topped section between the engine and a transmission housing, the tank being at least partially housed within the open-topped section of the chassis.

The above arrangement is well shielded from the hot air which has passed over the engine and being at least partially within the chassis is also protected from the heating effects of the sun.

The tank is preferably of a moulded plastic construction and has an upper section which includes a filler neck which is located outside the chassis for easy access.

The tank may also be moulded around other components which extend within the open-topped section of the chassis.

The upper section of the tank may include an outlet for the stored fluid and may support a level sensing arrangement for the fluid.

BRIEF DESCRIPTION OF THE DRAWINGS

The present invention will now be described, by way of example only, with reference to the accompanying drawings in which.

DETAILED DESCRIPTION OF THE INVENTION

Figure 1:
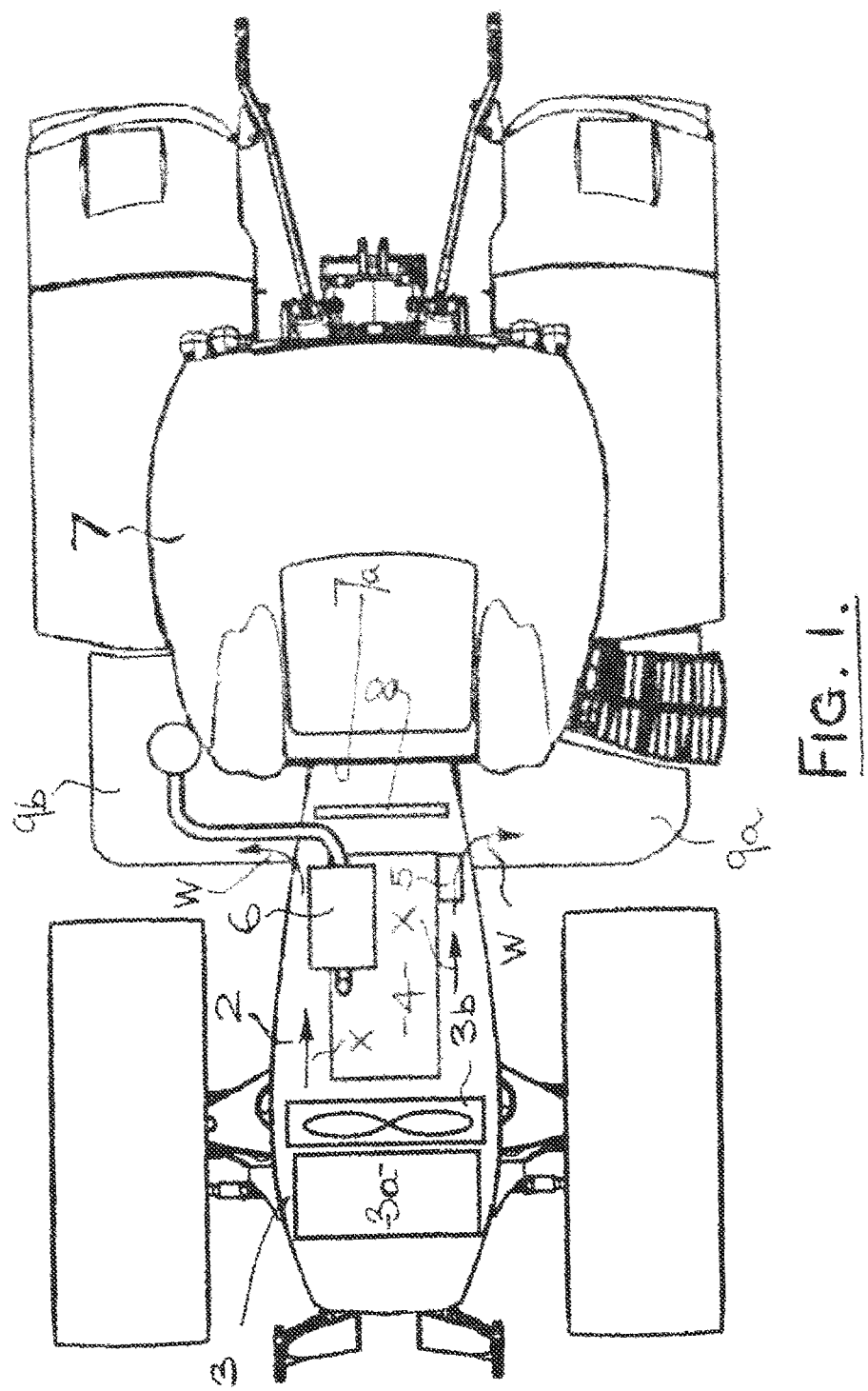
FIG. 1 shows diagrammatically a plan view of a typical prior art tractor tank arrangement.

FIG. 1 shows a typical tractor 1 which has an engine bay 2 in which is diagrammatically shown a cooling package 3 for an engine 4. The cooling package 3 includes a core heater/radiator assembly 3a with a cooling fan 3b. Ambient air is sucked by fan 3b through the heater/radiator assembly 3a and thereby heated up. The air is then passed over engine 4 and especially hot components like turbocharger 5 or the exhaust ducting 6. Due to hot surface temperatures (turbocharger 5 at a level of about 700° C. exhaust ducting 6 at about 300° C.) the air passing the engine (shown by arrows X) is enormously heated up, so air temperatures of up to 250° C. occur. To avoid any heat impact on the cab 7, a heat shield part shown diagrammatically at 8 is provided to guide the air out of the engine bay 2 before impacting on the front 7a of the cab 7. Thus the air is routed nearly sideways, as shown by arrows W. This results in additional heat impact on fluids such as diesel fuel or urea based fluids for exhaust treatment which are traditionally stored in tanks systems 9a and 9b on both sides of the tractor.

A tractor in accordance with the present invention has a chassis 10 (see FIG. 2) constructed from a number of cast components. Essentially the chassis comprises a front portion 11, a central transmission housing 12 and a rear back axle housing 13 (shown diagrammatically) which are bolted together to form the complete chassis.

The tractor engine 4 is mounted on the front portion 11 of the chassis which is basically U-shaped in cross section leaving, to the rear of the engine, an opened topped section 11a of the chassis in which, in accordance with the present invention, a storage tank 15 for storing a urea based fluid for injecting into the engine exhaust gases is located. The engine is covered by an engine bonnet 2a and the heat shield 8 protects the front portion 7a of the cab from the hot air which has passed over the engine and other hot components such as the turbocharger 5 and the exhaust ducting 6.

Figure 2:
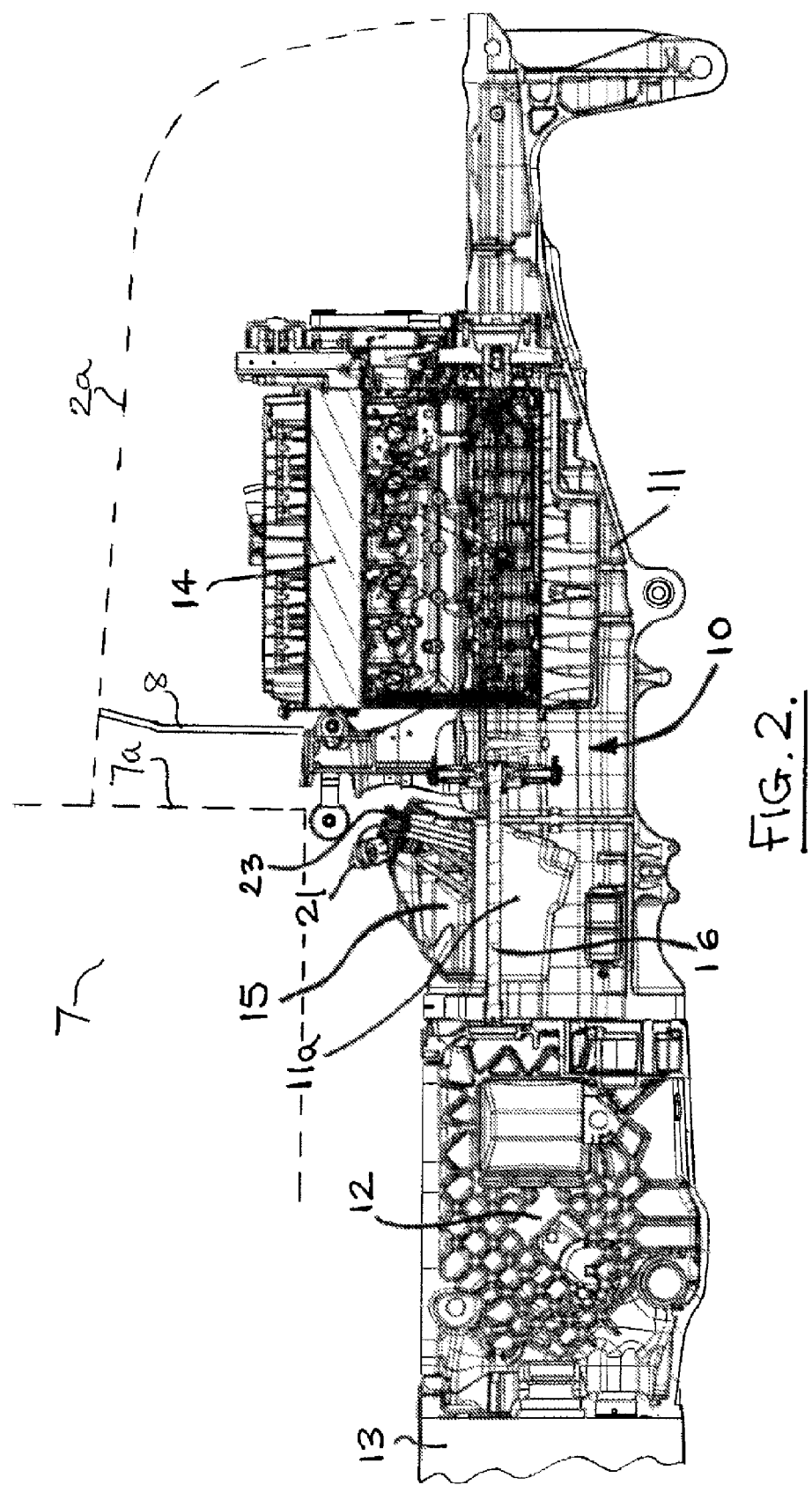
FIG. 2 shows a section on the line B-B of FIG. 2 or 5 of a tractor chassis in accordance with the present invention.
Figure 4:
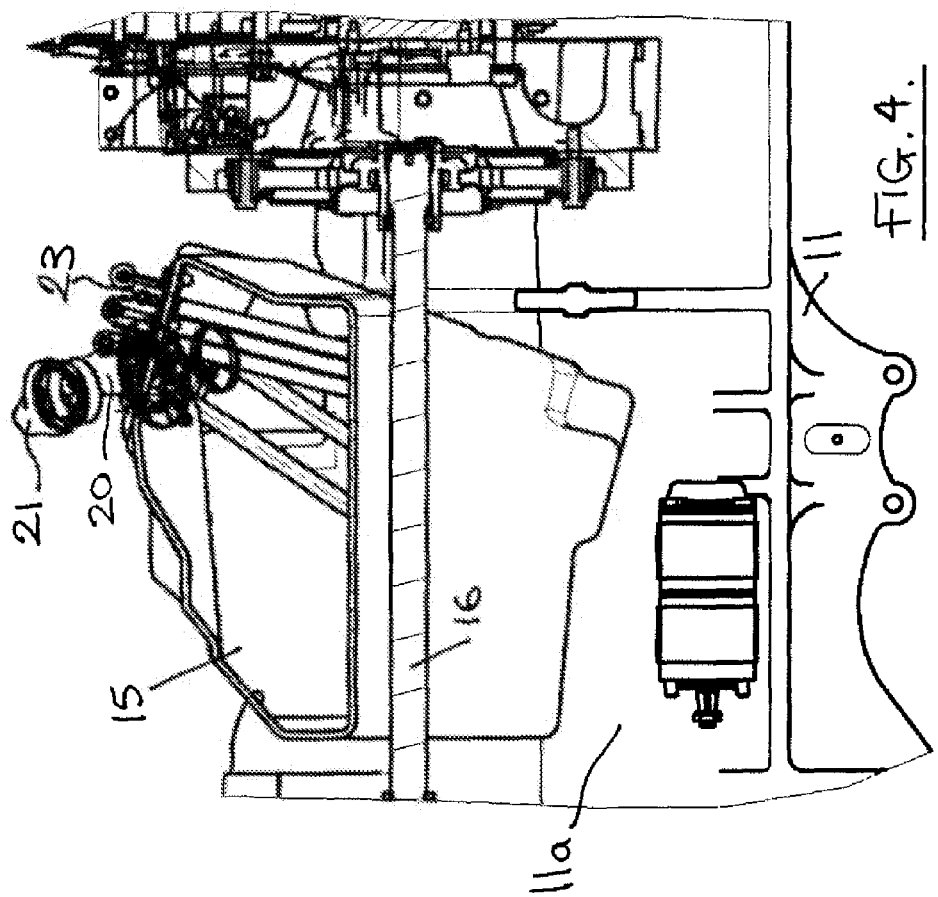
FIG. 4 shows part of FIG. 2 on a larger scale.
Figure 5:
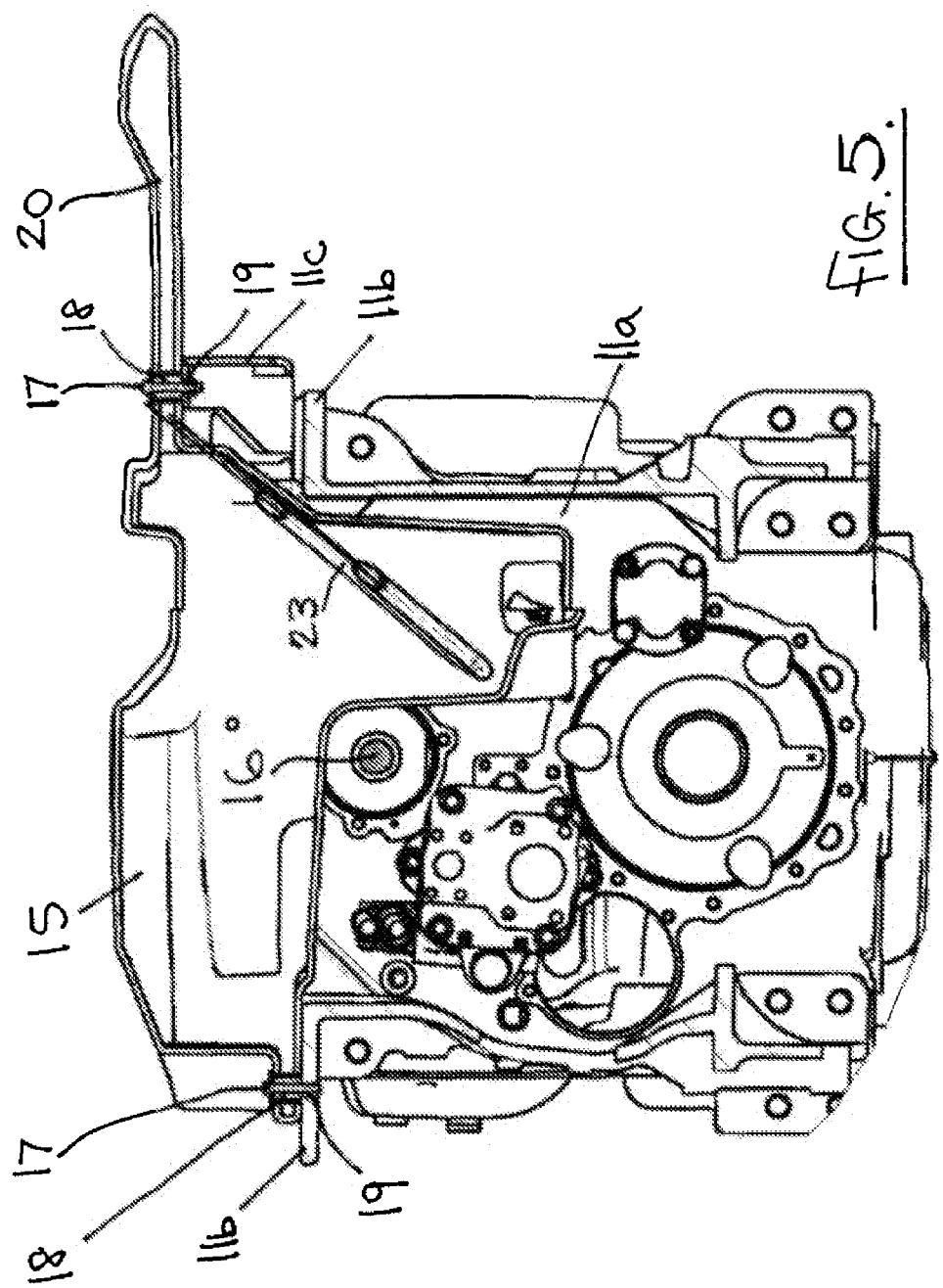
FIG. 5 shows, on a larger scale, a section on the line A-A of FIG. 3.
Figure 6:
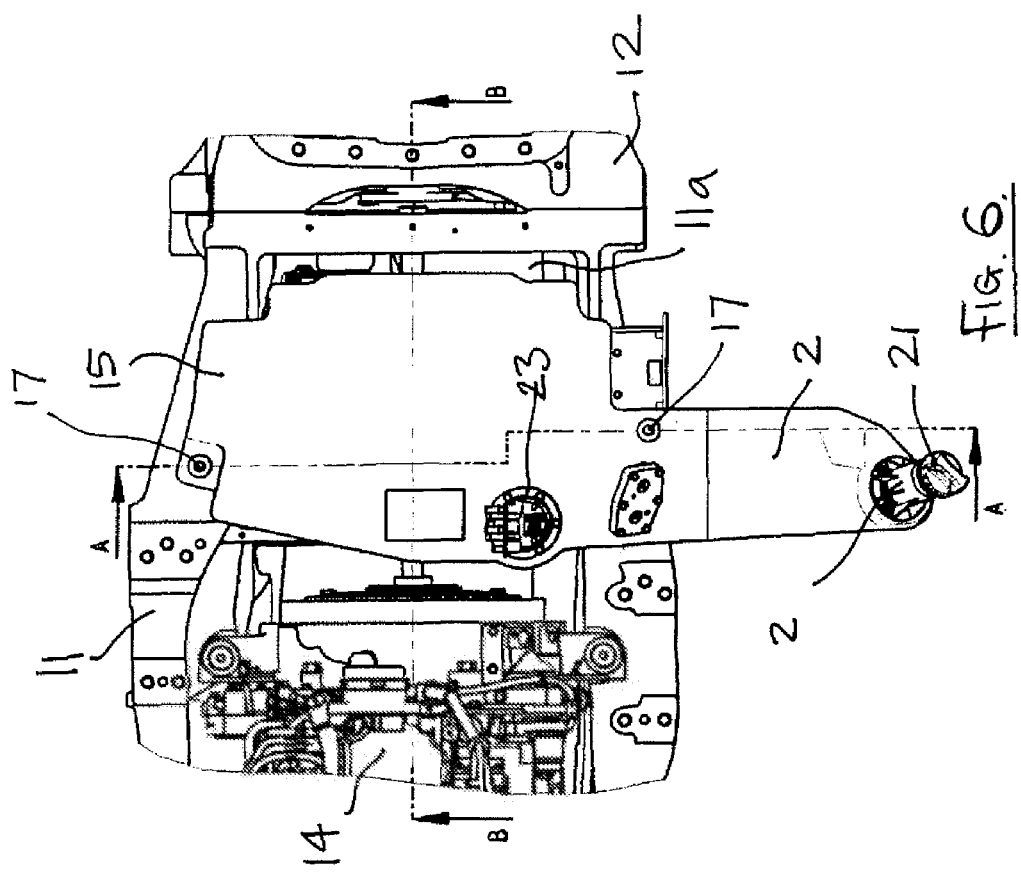
FIG. 6 shows part of FIG. 3 on a larger scale.
Figure 7:
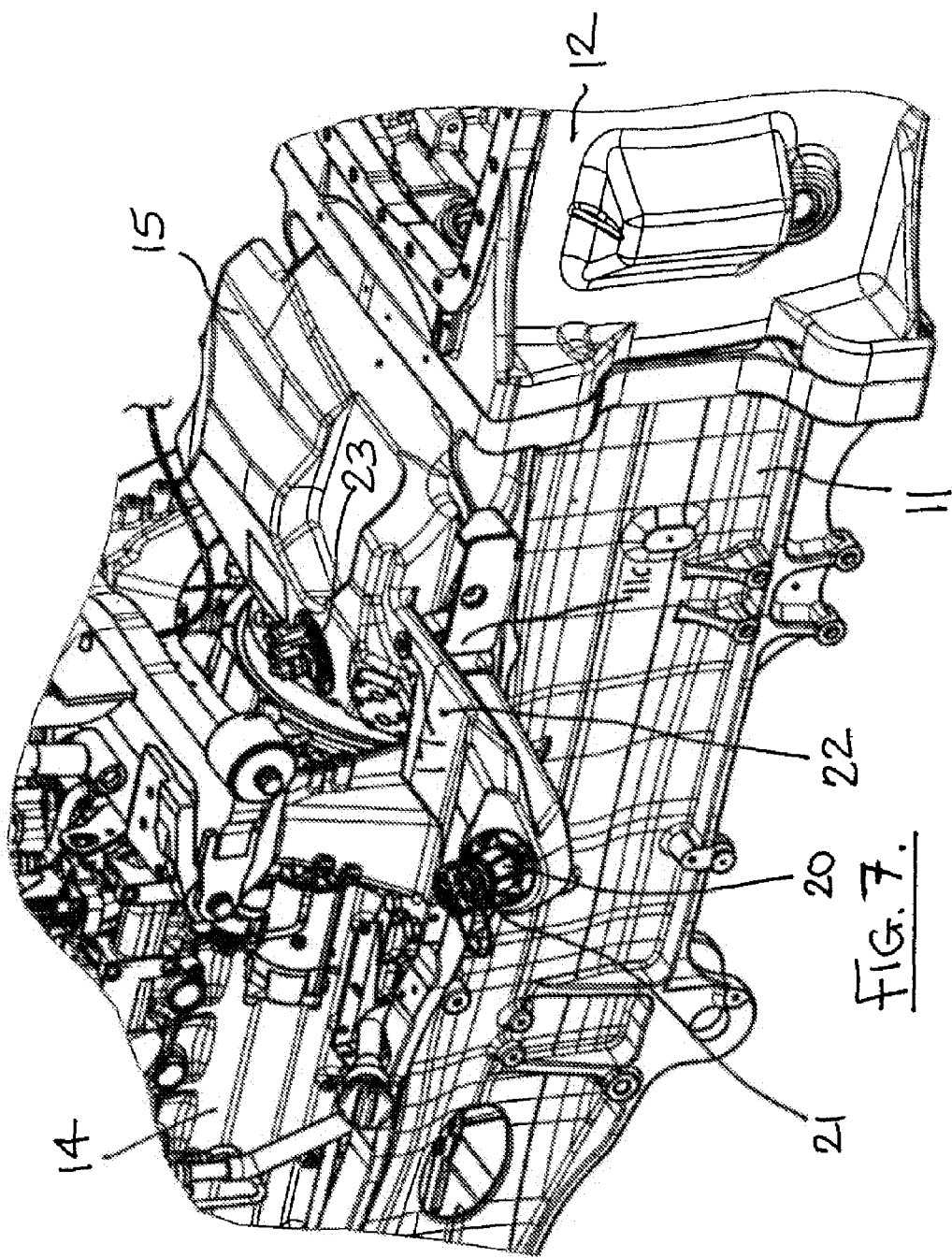
FIG. 7 shows a perspective view of part of the chassis if FIGS. 2 and 3.

As can been seen from FIG. 2, the engine 4 is connected with the tractor transmission within housing 12 by a drive shaft 16 which extends through the open topped section 11a of the chassis. FIGS. 2, 4 and 5 show that the storage tank 15 is shaped around the drive shaft 16. The tank is secured to flanges 11b of the chassis by screws 17 which extend through strengthening inserts 18 in the tank to engage holes 19 in the flanges 11b or a bracket 11c carried by flanges 11b.

Figure 3:
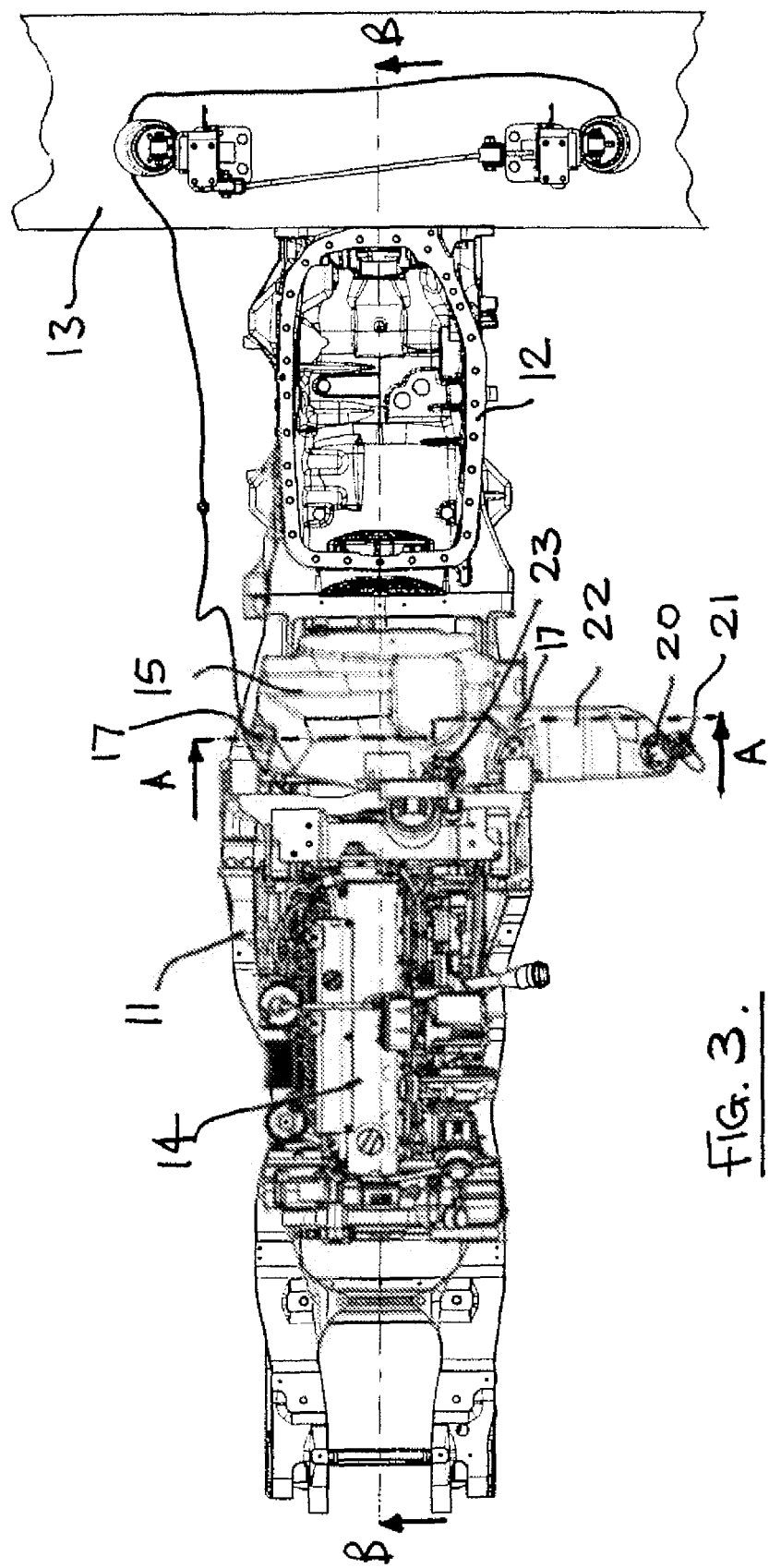
FIG. 3 shows a plan view of the tractor chassis of FIG. 2.

As can be seen most clearly in FIGS. 3 and 4, the tank has a filler neck 20 closed by a cap 21. Filler neck 20 is provided a portion 22 of the tank 15 which extends outside the chassis 11, for example in the vicinity of the steps in to the cab of the tractor, in order to provide easy access for the filling of the tank. The upper portion of the tank also includes a unit 23 which includes an outlet for the stored fluid and a level sensor to provide an indication as to the amount of fluid remaining in the storage tank 15.

As will be appreciated, by housing the storage tank within the opened topped section 11a of the chassis to the rear of the engine the tank is well shielded from hot air which has passed over the engine by shield 8 and, being at least partially within the chassis, is also protected from the heating effects of the sun. Thus the urea based fluid stored in the tank 15 is able to be maintained below the 60° C. preferred level either without requiring cooling or with a significantly reduced cooling requirement.

As will be appreciated, the precise shape of the storage tank 15 depends on the other components which may pass through or be housed within the open top section 11a of the chassis. Since the tank is preferably formed from plastics material using a moulding process its shape can be carefully tailored to provide the maximum storage volume within the free space in the section 11a of the chassis. The tank may be partially within the chassis as described above or may be entirely within the chassis if the layout of the tractor permits this.

The invention claimed is:

1. A tractor having a chassis which supports an engine and a cooling fan towards the front thereof, a deflecting shield positioned to the rear of the engine configured to deflect sideways hot air blown by the fan over the engine, and a urea based fluid storage tank which injects a urea fluid into an exhaust system of the engine, the tank being located behind the engine to the rear of the deflecting shield and wherein the chassis to the rear of the engine has an open-topped section between the engine and a transmission housing and the tank is at least partially housed within the open-topped section of the chassis.

2. A tractor according to claim 1 in which the tank is of a moulded plastic construction and has an upper section which includes a filler neck which is located outside the chassis for easy access.

3. A tractor according to claim 1 in which the tank is moulded around other components which extend within the open-topped section of the chassis.

4. A tractor according to claim 2 in which the upper section of the tank includes an outlet for the stored fluid and supports a level sensing arrangement for the fluid.

\* \* \* \* \*